(12) United States Patent
Canfield et al.

(10) Patent No.: US 8,368,365 B2
(45) Date of Patent: Feb. 5, 2013

(54) CONTINUOUSLY SWITCHING BUCK-BOOST CONTROL

(75) Inventors: John Christopher Canfield, Newmarket, NH (US); James Edward Wells, Merrimack, NH (US)

(73) Assignee: Linear Technology Corporation, Milpitas, CA (US)

( * ) Notice: Subject to any disclaimer, the term of this patent is extended or adjusted under 35 U.S.C. 154(b) by 413 days.

(21) Appl. No.: 12/642,634

(22) Filed: Dec. 18, 2009

(65) Prior Publication Data

US 2011/0148373 A1 Jun. 23, 2011

(51) Int. Cl.
*G05F 1/618* (2006.01)
*G05F 1/62* (2006.01)

(52) U.S. Cl. .......................... 323/259; 323/225; 323/271

(58) Field of Classification Search .................. 323/225, 323/259, 271, 272, 284, 285, 282, 344
See application file for complete search history.

(56) References Cited

U.S. PATENT DOCUMENTS

| | | | |
|---|---|---|---|
| 6,166,527 A | 12/2000 | Dwelley et al. | |
| 6,404,251 B1 | 6/2002 | Dwelley et al. | |
| 6,812,676 B2 * | 11/2004 | Tateishi | 323/225 |
| 7,154,250 B2 * | 12/2006 | Vinciarelli | 323/240 |
| 7,157,888 B2 * | 1/2007 | Chen et al. | 323/224 |
| 7,298,119 B1 | 11/2007 | Amram Summit et al. | |
| 7,701,179 B2 * | 4/2010 | Chen et al. | 323/259 |
| 7,723,965 B2 * | 5/2010 | Lesso et al. | 323/225 |
| 8,129,961 B2 * | 3/2012 | Buethker | 323/225 |
| 2005/0093526 A1 | 5/2005 | Notman | |
| 2005/0206354 A1 | 9/2005 | Ikezawa | |

FOREIGN PATENT DOCUMENTS

| | | |
|---|---|---|
| EP | 2337206 A1 | 6/2011 |
| WO | 01/13502 A1 | 2/2001 |

OTHER PUBLICATIONS

Extended European Search Report, dated Sep. 21, 2011, for European Patent Application No. 11005360.0-2207, filed Jun. 30, 2011 (published as EP 2378650 A1, Oct. 19, 2011), which is a divisional application of European Patent Application No. 10015745.2-2207, filed Dec. 16, 2010, entitled Buck-Boost Switching Regulator (published as EP 2337206 A1, Jun. 22, 2011), counterpart to U.S. Appl. No. 12/642,634.

Extended European Search Report, dated Apr. 13, 2011, for European Patent Application No. 10015745.2-2207, filed Dec. 16, 2010, entitled Buck-Boost Switching Regulator (published as EP 2337206 A1, Jun. 22, 2011), counterpart to U.S. Appl. No. 12/642,634.

* cited by examiner

*Primary Examiner* — Gary L Laxton
(74) *Attorney, Agent, or Firm* — McDermott Will & Emery LLP

(57) ABSTRACT

A buck-boost converter with a switch controller may cause switches A, B, C, and/or D to cyclically close such that switches B and C are closed during at least one interval of each cycle during both the buck and boost modes of operation. The switch controller may in addition or instead cause switches A, B, C, and/or D to cyclically close based on a control signal such that switches A and D are closed during an interval of each cycle and such that these intervals are never both simultaneously modulated by a small change in the control signal during any mode of operation.

22 Claims, 4 Drawing Sheets

CONTINUOUSLY SWITCHING BUCK-BOOST CONTROL

BACKGROUND

1. Technical Field

This disclosure relates to switching power supplies, including buck-boost converters.

2. Description of Related Art

Buck-boost converters may be used to produce a constant DC output voltage, notwithstanding a DC input voltage which may be higher, lower, or equal to the output voltage. They may operate in a buck mode, a boost mode, and/or a buck-boost mode. The converter is considered to be in a buck mode of operation when the input voltage is higher than the output voltage, in a boost mode of operation when the input voltage is lower than the output voltage, and in a buck-boost mode of operation when the input voltage is approximately the same as the output voltage.

Buck-boost converters may include an inductance having a first and a second connection. They may also include four electronic switches: an electronic switch A configured to cause the first connection to the inductance to be controllably coupled to an input voltage source; an electronic switch B configured to cause the first connection to the inductance to be controllably coupled to a ground; an electronic switch C configured to cause the second connection to the inductance to be controllably coupled to a ground; and an electronic switch D configured to cause the second connection to the inductance to be controllably coupled to a load output. They may also include a capacitance configured to filter the load output. They may also include a switch controller configured to cause switches A, B, C, & D to operate in a manner which controllably causes the converter to operate in the buck, boost, and/or buck-boost mode of operation:

Buck-boost converters may utilize two phase AC-BD switching with a voltage mode control loop to set the duty cycle (i.e. the point at which the AC phase is switched to the BD phase). This approach may produce almost any desired step-up or step-down voltage ratio. However the inductor current that results may be much larger than it needs to be to support any given load. This may result in poor efficiency, since resistive losses may increase dramatically and the deliverable output current (for a given switch current limitation) may be greatly reduced.

Buck-boost converters may cause switches A and C to close during one interval, switches A and D to close during another interval, and switches B and D to close during a still further interval. This approach may use a dual, pulse-width modulated ("PWM") ramp as a means of transitioning between the boost, buck-boost, and buck modes of operation. However, this approach may result in perturbations to the operating state when transitioning between these modes of operation.

SUMMARY

A buck-boost converter may include an inductance having a first and a second connection. The converter may also include an electronic switch A configured to cause the first connection to the inductance to be controllably coupled to an input voltage source; an electronic switch B configured to cause the first connection to the inductance to be controllably coupled to a ground; an electronic switch C configured to cause the second connection to the inductance to be controllably coupled to a ground; and an electronic switch D configured to cause the second connection to the inductance to be controllably coupled to a load output. The converter may also include a capacitance configured to filter the load output. The converter may also include a switch controller.

The switch controller may be configured to cause switch A, B, C, & D to be open when, respectively, switch B, A, D, and C is closed. The switch controller may also cause switches A, B, C, and/or D to cyclically close in accordance with one of the following patterns:

a first pattern during which:
  during a buck mode of operation:
    switches B and C are closed during one interval of the cycle;
    switches A and D are closed during another interval of the cycle; and
    switches B and D are closed during a still further interval of the cycle; and
  during a boost mode of operation:
    switches B and C are closed during one interval of the cycle;
    switches A and C are closed during another interval of the cycle; and
    switches A and D are closed during a still further interval of the cycle; and
a second pattern during which:
  during a buck mode of operation:
    switches B and C are closed during one interval of the cycle;
    switches A and D are closed during another interval of the cycle; and
    switches B and D are closed during a still further interval of the cycle; and
  during a buck-boost mode of operation:
    switches B and C are closed during one interval of the cycle;
    switches A and are closed C during another interval of the cycle;
    switches A and D are closed during a still further interval of the cycle; and
    switches B and D are closed during a still further interval of the cycle; and
  during a boost mode of operation:
    switches B and C are closed during one interval of the cycle;
    switches A and C are closed during another interval of the cycle; and
    switches A and D are closed during a still further interval of the cycle; and
a third pattern during which:
  during a buck mode of operation:
    switches B and C are closed during one interval of the cycle;
    switches A and D are closed during another interval of the cycle; and
    switches B and D are closed during a still further interval of the cycle; and
  during a buck-boost mode of operation:
    switches B and C are closed during one interval of the cycle; and
    switches A and D are closed during a still further interval of the cycle; and
  during a boost mode of operation:
    switches B and C are closed during one interval of the cycle;
    switches A and C are closed during another interval of the cycle; and
    switches A and D are closed during a still further interval of the cycle.

The switch controller may be configured to cause switches A, B, C, and/or D to cyclically close such that switches B and C are closed during at least one interval of each cycle during the buck, boost, and buck-boost modes of operation.

The switch controller may be configured to cause switches A, B, C, and/or D to cyclically close based on a control signal such that switches A and D are closed during an interval of each cycle and such that these intervals are never both simultaneously modulated by a small change in the control signal during of operation.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

FIG. 2A illustrates switch pin signals which may cause the converter to operate in a buck mode; FIG. 2B illustrates switch pin signals which may cause the converter to operate at a boundary between a buck and a boost mode; and FIG. 2C illustrates switch pin signals which may cause the converter to operate in a boost mode.

FIG. 3A illustrates the ramps being used to produce switch pin signals which may cause the converter to operate in a buck mode; FIG. 3B illustrates the ramps being used to produce switch pin signals which may cause the converter to operate at a boundary between a buck and a boost mode; and FIG. 3C illustrates the ramps being used to produce switch pin signals which may cause the converter to operate in a boost mode.

FIG. 4A illustrates the ramps being used to produce switch pin signals which may cause the converter to operate in a buck mode; FIG. 4B illustrates the ramps being used to produce switch pin signals which may cause the converter to operate in a buck-boost mode; and FIG. 4C illustrates the ramps being used to produce switch pin signals which may cause the converter to operate in a boost mode.

FIG. 5A illustrates the ramps being used to produce switch pin signals which may cause the converter to operate in a buck mode; FIG. 5B illustrates the ramps being used to produce switch pin signals which may cause the converter to operate at a boundary between a buck and a boost mode; and FIG. 5C illustrates the ramps being used to produce switch pin signals which may cause the converter to operate in a boost mode.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
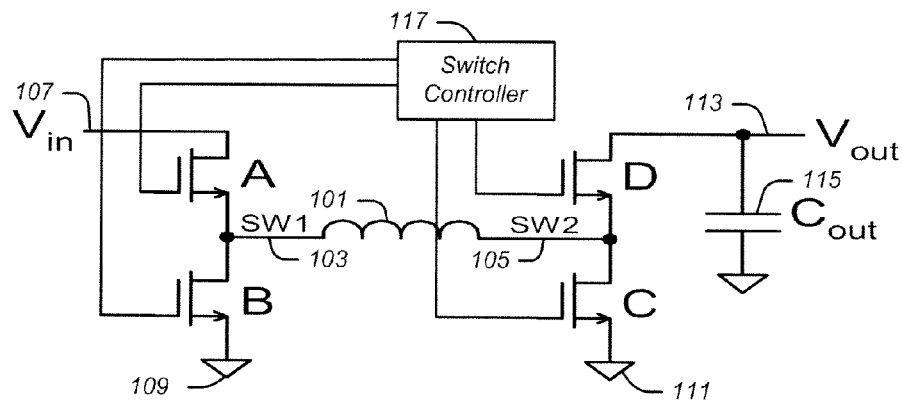
FIG. 1 illustrates components of a prior art buck-boost converter.

FIG. 1 illustrates components of a prior art buck-boost converter. Such a converter may include an inductance 101 having a first connection 103 and a second connection 105. The inductance 101 may be provided by any type of inductor or set of inductors in any arrangement.

The converter may also include an electronic switch A configured to cause the first connection 103 to the inductance to be controllably coupled to an input voltage source 107; an electronic switch B configured to cause the first connection 103 to the inductance to be controllably coupled to a ground 109; an electronic switch C configured to cause the second connection 105 to the inductance to be controllably coupled to a ground 111; and an electronic switch D configured to cause the second connection to the inductance to be controllably coupled to a load output 113. Each switch may include one or more FETs, MOSFETs, BJTs, IGBTs, diodes, or any combination of these. Single N-channel MOSFETs are illustrated in FIG. 1 for switches A, B, C, & D merely as an example.

The word "coupling" as used throughout this disclosure embraces both a direct coupling with no associated components and an indirect coupling that may involve associated components, such as an intervening current sensing resistance or current sensing transformer.

The converter may include a capacitance 115 configured to filter the load output 113. The capacitance 115 may include one or more capacitors connected in any configuration and in any way in the circuit which effectuates filtering of the load output 113. Other filtering components may additionally be used.

The converter may include a switching controller configured to control the states of the switches A, B, C, & D. The switching controller may be configured to cause switch A, B, C, & D to be open when, respectively, switch B, A, D, and C is closed. This may result in only two composite switching states, indicated in FIG. 1 and throughout this disclosure as switch pins signals SW1 and SW2.

The switching controller may be configured to regulate the switch pin signals SW1 and SW2 so as to cause the converter to operate in different modes and, within each mode, with different lengths of on-time for each of switches A, B, C, and D. The switching controller may be configured to exercise this control based on a control signal. The switching controller may be configured to regulate each of the switches A, B, C, D, by producing pulse-width modulated ("PWM") signals that are based on the control signal. The switching controller may include circuitry components configured to produce such PWM signals consistent with one or more of the timing schemes disclosed herein. The switching controller may in addition or instead include computer software with algorithms configured to generate such timings and associated computer hardware, such as one or more data storage devices, processors, and input-output devices.

Figures 2A, 2B, 2C:
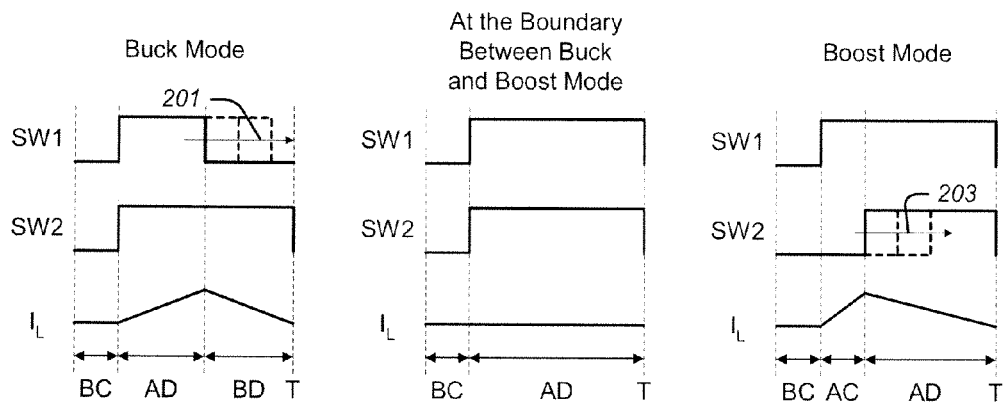
FIGS. 2A-2C illustrate switch pin signals which may be applied to the buck-boost converter illustrated in FIG. 1.

FIGS. 2A-2C illustrate switch pin signals which may be applied to the buck-boost converter illustrated in FIG. 1. FIG. 2A illustrates switch pin signals which may cause the converter to operate in a buck mode; FIG. 2B illustrates switch pin signals which may cause the converter to operate at a boundary between a buck and a boost mode; and FIG. 2C illustrates switch pin signals which may cause the converter to operate in a boost mode. These switch pin signals may be generated by the switching controller.

The switch pin operational modes are shown in FIGS. 2A-2C as well as in FIGS. 3A-3C, 4A-4C, and 5A-5C by stating the letter of each switch which is on during the indicated interval, it being understood that the switch letters which do not appear are open during this period. Thus, for example, the designation "BC" in FIG. 2A means that switches B and C are on during the indicated interval while switches A and D are off.

As illustrated in FIGS. 2A-2C, each switching cycle may be initiated by turning both switches B and C on. This may force SW1 and SW2 to be low for the duration of this interval.

Figure 6:
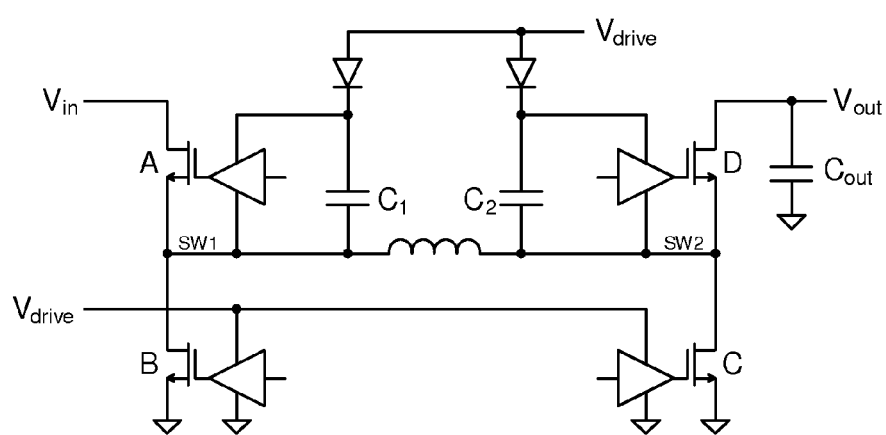
FIG. 6 illustrates a buck-boost converter with a boost capacitor associated with each connection to the inductor and which is configured to charge each boost capacitor when switches B and C are closed.

The buck-boost converter may be configured with charge pump capacitors which may be attached to pins SW1 and SW2 as illustrated in FIG. 6. During this initial BC interval, both switch pins SW1 and SW2 may be low, which may cause these charge pump capacitors to charge. These charge pump capacitors may then be used to power high-side NMOS gate drivers which may be used for switches A and D.

The BC interval may be of any length. It may be made short, such as between 50 and 100 ns, so as to have a relatively minor impact on the dynamics and efficiency of the converter because, to a first order approximation, the inductor current may simply be held constant for the extent of the BC interval. (Note that the BC interval is exaggerated in the drawings for illustrative purposes. In actual implementations, it may be on the order of 10% of the switching period or shorter.)

As an example, Vin may be high (e.g. 40V) and the timing of the switches A, B, C, and D may be set so as to cause Vout to be relatively fixed at a lower voltage (e.g. 10V). In this case, the converter may be said to operate in a buck mode, as illustrated in FIG. 2A. SW1 may be high for only a very short period during each cycle, while SW2 may be high for the entire cycle, except for the brief BC phase when it may be forced low at the start of each cycle.

Vin may then be gradually reduced, with Vout held constant (i.e. in regulation). As Vin is decreased, the SW2 waveform may remain the same, but the SW1 falling edge may gradually move later in the switching cycle, as shown by an arrow 201 in FIG. 2A. As a result, the AD phase may be extended and the BD phase may be proportionately reduced. This may cause the effective buck duty cycle to increase. When Vin is reduced to the point that it is equal to Vout, the SW1 falling edge may extend out to the end of the switching cycle and both switch pin waveforms may be identical, as shown in FIG. 2B. This may define a theoretical but for all practical purposes a non-existent boundary between a buck and a boost mode of operation, as will now be explained.

As Vin is reduced below Vout, the converter may enter a boost mode, as shown in FIG. 2C. During this mode, the rising edge of SW2 may gradually move later in the switching period, as illustrated by an arrow 203. In the boost mode, the SW1 waveform may remain high for the entire interval, except for the brief BC phase where it is forced low at the start of each cycle, as illustrated in FIG. 2C. Each switch pin may therefore have a finite low time and finite high time during every switch cycle. As a result, no new switch states may be phased in as the converter switches across all operational modes. The transition from buck to boost mode may therefore be smooth and free of perturbations.

Dual Ramp PWM with No Buck-Boost Region

Figures 3A, 3B, 3C:
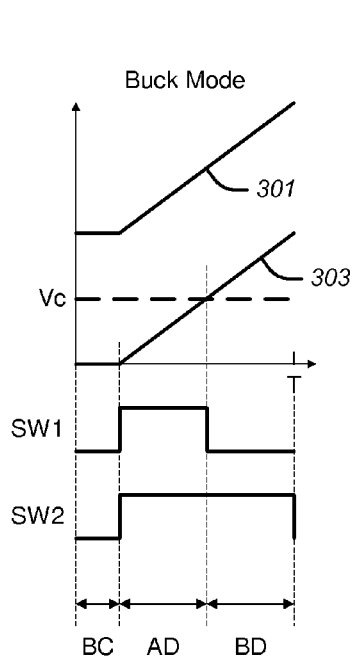
FIGS. 3A-3C illustrate dual, non-overlapping ramps which may be used to produce switch pin signals which may be applied to the buck-boost converter illustrated in FIG. 1.

FIGS. 3A-3C illustrate dual, non-overlapping ramps which may be used to produce switch pin signals which may be applied to the buck-boost converter illustrated in FIG. 1. FIG. 3A illustrates the ramps being used to produce switch pin signals which may cause the converter to operate in a buck mode; FIG. 3B illustrates the ramps being used to produce switch pin signals which may cause the converter to operate at a boundary between a buck and a boost mode; and FIG. 3C illustrates the ramps being used to produce switch pin signals which may cause the converter to operate in a boost mode. These switch pin signals may be generated by the switching controller.

As illustrated in FIGS. 3A-3C, one switching pattern which the switch controller may generate may utilize PWM ramps 301 and 303. These ramps may be synchronous with no voltage overlap between. The higher-voltage level ramp 301 may be initiated at the highest voltage level which is reached by the lower voltage ramp 303. Two comparators may be utilized, one for controlling each of the switch pins. One comparator may monitor the lower ramp 303 and force SW1 low when the lower ramp exceeds a reference control signal Vc, while the other comparator may monitor the upper ramp 301 and force SW2 high when the upper ramp exceeds Vc. Independent of the state of the comparators, SW1 and SW2 may both be forced low for the initial BC interval. Illustrative circuitry which may be used in the switch controller to generate such ramps and compare $V_c$ to them is described in U.S. Pat. Nos. 6,404,251 and 6,166,527 which are incorporated herein by reference.

At high step down ratios, Vc may be near zero and the converter may operate in buck mode with SW1 high for a short duration and SW2 high for most of the switching cycle. As Vc increases, the duty cycle of SW1 may increase as well. If Vc is increased to the midpoint between the ramps, as illustrated in FIG. 3B, both switch pins may receive the same waveform. At this point, there may be no effective change in inductor current over the switching cycle. As Vc is increased further, the converter may enter a boost mode and SW1 may remain high for the entire cycle, except for the brief forced BC interval, while the low-time of SW2 may be modulated by Vc, as illustrated in FIG. 3C. As Vc increases, the low time of SW2 may increase as well. This low time may be limited by a fixed maximum duty cycle.

Dual Ramp PWM with Overlapping Upper and Lower Ramps

Figure 4A:
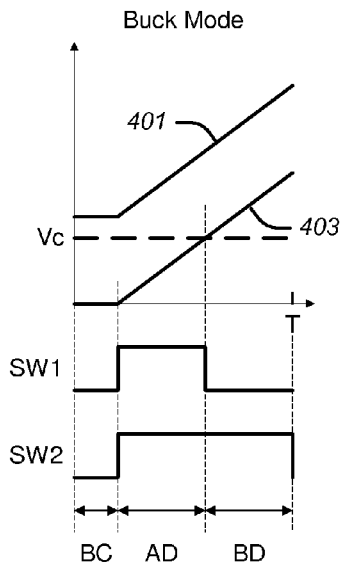
FIGS. 4A-4C illustrate dual, overlapping ramps which may be used to produce switch pin signals which may be applied to the buck-boost converter illustrated in FIG. 1.
Figure 4B:
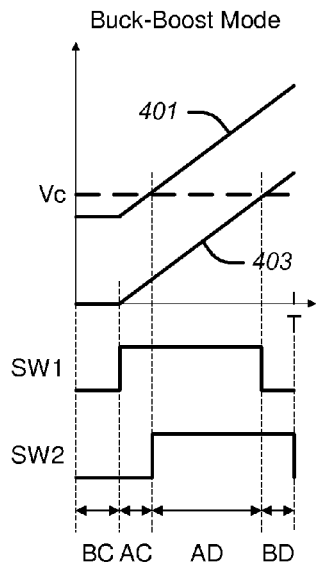
Figure 4C:
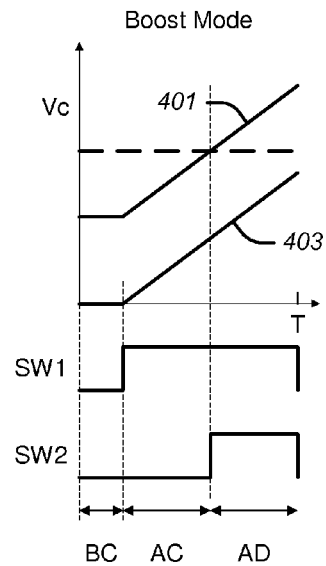

FIG. 4A-4C illustrate dual, overlapping ramps which may be used to produce switch pin signals which may be applied to the buck-boost converter illustrated in FIG. 1. FIG. 4A illustrates the ramps being used to produce switch pin signals which may cause the converter to operate in a buck mode; FIG. 4B illustrates the ramps being used to produce switch pin signals which may cause the converter to operate in a buck-boost mode; and FIG. 4C illustrates the ramps being used to produce switch pin signals which may cause the converter to operate in a boost mode. These switch pin signals may be generated by the switching controller.

As illustrated in FIGS. 4A-4C, another switching pattern which the switch controller may generate may utilize overlapping PWM ramps 401 and 403. These may be comparable to PWM ramps 301 and 303, except that they may overlap, as illustrated in FIGS. 4A-4C, while maintaining a forced BC interval. This may create a region of buck-boost operation in which the SW1 and SW2 edges are simultaneously modulated, as illustrated in FIG. 4B. In the buck-boost mode, as the AC interval increases in duration, the BD interval may decrease by the same amount. As illustrated, there may be a fixed BC interval and the switches may transition every cycle, independent of operational mode.

The small-signal PWM gain in this mode of operation may be much higher than the gain in other types of buck-boost converters under similar operating conditions. This may make it difficult to compensate the network to optimize the transient response across operational modes.

Dual Ramp PWM with Intentional Dead Band

Figures 5A, 5B, 5C:
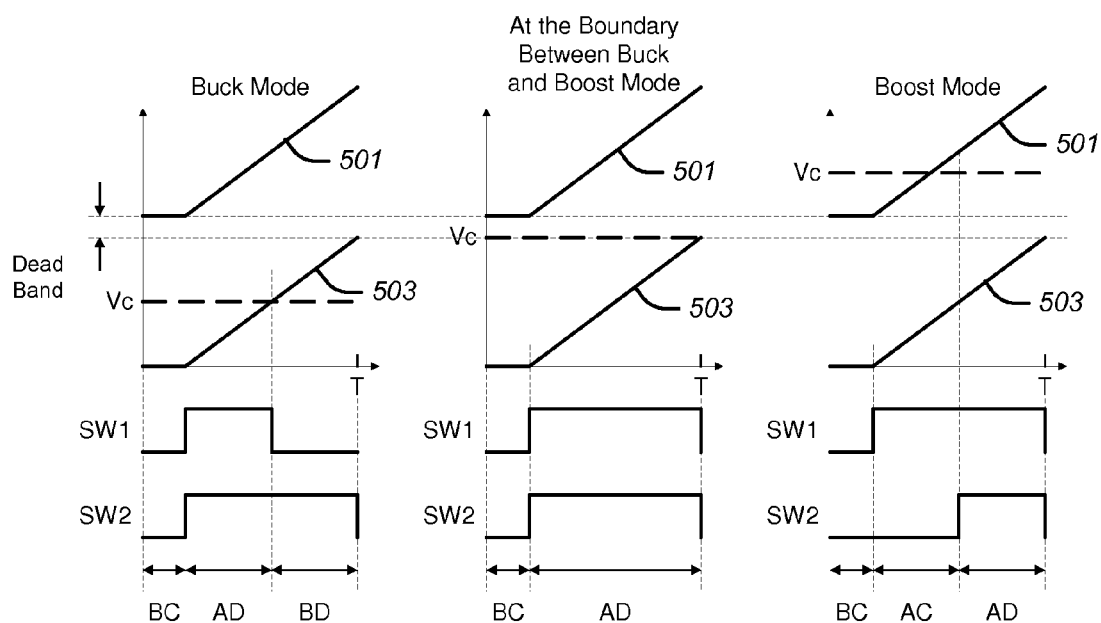
FIGS. 5A-5C illustrate dual, non-overlapping ramps with a dead band between which may be used to produce switch pin signals which may be applied to the buck-boost converter illustrated in FIG. 1.

FIGS. 5A-5C illustrate dual, non-overlapping ramps with a dead band between which may be used to produce switch pin signals which may be applied to the buck-boost converter illustrated in FIG. 1. FIG. 5A illustrates the ramps being used to produce switch pin signals which may cause the converter to operate in a buck mode; FIG. 5B illustrates the ramps being used to produce switch pin signals which may cause the converter to operate at a boundary between a buck and a boost mode; and FIG. 5C illustrates the ramps being used to produce switch pin signals which may cause the converter to operate in a boost mode. These switch pin signals may be generated by the switching controller.

As illustrated in FIG. 5A, another switching pattern which the switch controller may generate may utilize non-overlapping PWM ramps 501 and 503 with a dead band between them. These may be comparable to PWM ramps 301 and 303, except that there may be a dead band between them.

In physical implementations, it may be impossible to attain upper and lower ramps that have exactly zero vertical separation. This may be due to mismatches in components used to generate the upper and lower ramps, as well as internal random offsets in the upper and lower comparators. Therefore, to ensure against a buck-boost region (i.e. when the SW1 and SW2 edges are simultaneously modulated), the upper ramp 501 and the lower ramp 503 may have a small dead band between. The separation may be sized so that it is large enough to maintain separation between the upper ramp 501 and the lower ramp 503, notwithstanding worst case random offsets.

This alternate switching pattern may operate similarly to the one illustrated in FIGS. 3A-3C, except that there may be a small dead band which may cause a range of Vc over which the switch waveforms may not change. As long as this dead band is kept small, it may have little impact on the performance of the converter.

The switching patterns which have been described may have a forced BC interval which may ensure that both switches are low for a portion of every switching cycle. This may result in a continuously switching architecture whereby both switch pins transition on every switching period. No new switch state need be introduced. The minimum switch on-time at the introduction of these switch states may result in a substantial reduction in switch pin "jitter" and in inductor current and output voltage ripple at the mode transition boundaries.

The switching patterns illustrated in FIGS. 3A-3C and 5A-5C may also eliminate the buck-boost region of operation. The buck-boost region of operation may have a much higher small signal PWM gain then the buck mode and boost mode gains under similar operating conditions. As a result, elimination of the high gain buck-boost region may make loop compensation easier and may allow the transient response to be optimized across all operational modes. As a result, rather than having three regions of operation (buck, buck-boost, and boost), the switching patterns illustrated in FIGS. 3A-3C and 5A-5C may have only a buck and boost region of operation, while still maintaining the ability to operate with arbitrary input and output voltages. In buck mode, only the SW1 edge may be modulated, while in the boost mode, only the SW2 edge may be modulated. There may be no buck-boost region where both the SW1 and SW2 edges are simultaneously modulated.

As a consequence of this design, the gain may be significantly higher in the buck-boost region, and eliminating this region may make the gain similar to the gain in the buck and the boost mode.

By way of overview, the switching patterns which have been described in connection with FIGS. 3A-3C and 5A-5C may substantially eliminate mode transition perturbations and remove the high gain buck-boost operational mode, while providing seamless functionality with output voltages above, equal, or below the input voltage. The switching pattern illustrated in FIGS. 4A-4C may provide similar benefits, but may have a buck-boost operational mode. The features of these approaches may include:

Continuously Switching Architecture—On every switch cycle, both switch pins may spend some duration in both the low and high state independent of operational mode. As the operational mode changes, the duration of the switch states may vary, but no new switch states may be phased in under any case. This may eliminate the perturbations associated with phasing in new switch states and produce seamless mode transitions.

Forced Minimum Low Times on SW1, SW2—Both of the switch pins may be simultaneously forced low for some minimum duration on every cycle. This may facilitate the charging of flying capacitors used to power high side NMOS drivers for switches A and D.

No Buck-Boost Mode of Operation—The buck-boost region of operation (characterized by simultaneous modulation of the AC and BD intervals) may be eliminated in connection with the switching patterns illustrated in FIGS. 3A-3C and 5A-5C. Instead, the converter may have only two operational modes: buck and boost. The DC gain of the PWM in buck-boost operation may be much higher than in buck or boost mode and therefore, elimination of this mode of operation may simplify compensation of the converter and optimize the transient response across operational modes.

FIG. 6 illustrates a buck-boost converter with a boost capacitor associated with each connection to the inductor (boost capacitors C1 and C2) and which is configured to charge each boost capacitor when switches B and C are closed. Different configurations may be used instead.

Figure 7:
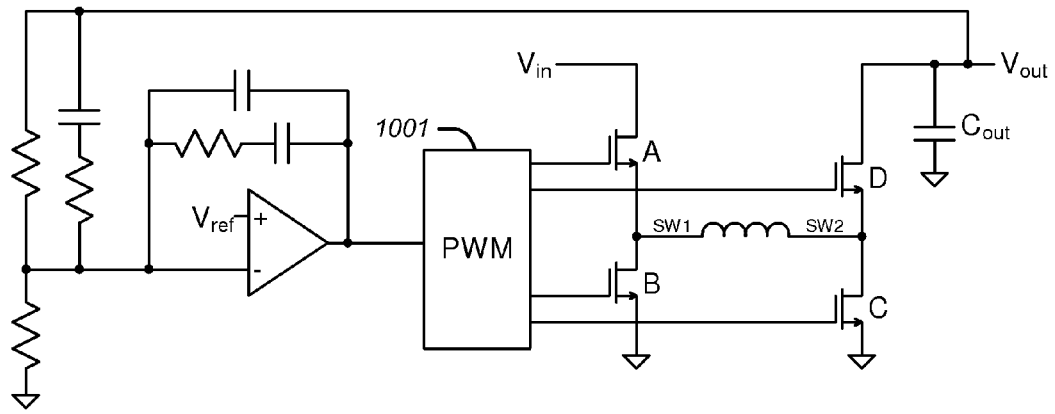
FIG. 7 illustrates a buck-boost converter which includes a voltage mode control loop configured to generate a control signal.

FIG. 7 illustrates a buck-boost converter which includes a voltage mode control loop configured to generate a control signal. The switch controller 1001 may use pulse width modulation, as described above. Different configurations may be used instead.

Figure 8:
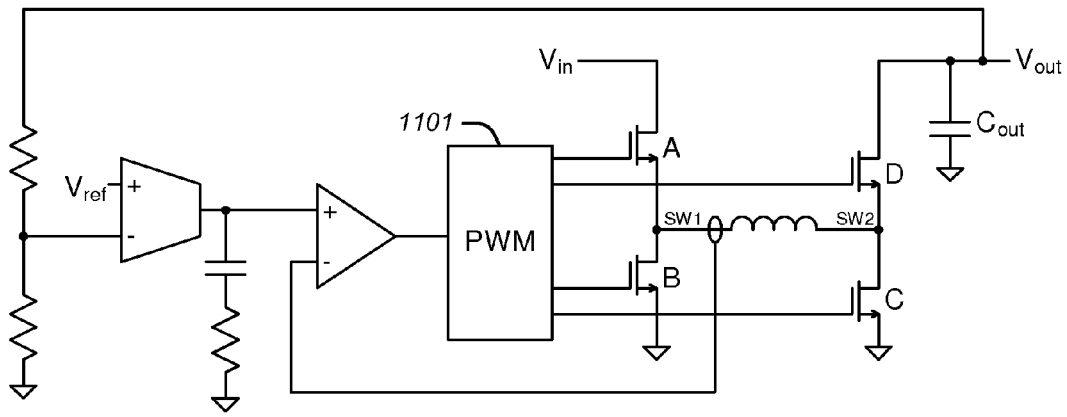
FIG. 8 illustrates a buck-boost converter which includes a current mode control loop configured to generate a control signal.

FIG. 8 illustrates a buck-boost converter which includes a current mode control loop configured to generate a control signal. The switch controller 1101 may use pulse width modulation, as described above. Different configurations may be used instead.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the order of the switch phases may be altered from what is illustrated in FIGS. 3A-3C, FIGS. 4A-4C, and FIGS. 5A-5C. This may simplify generation of the PWM signals. Additional power switches may couple the first terminal of the inductance to alternate input power sources. Such additional power switches may be controlled in a similar fashion as switch A, but may provide operation from additional power sources. Current sensing elements may be added in series with any current carrying path in FIG. 1, such as in series with either terminal of the inductance, or any terminal of the switches A-D. Such current sensing may be performed as part of the control loop, for example in an average current mode control loop, or may be performed for other reasons, such as monitoring or for current limit protection. The buck-boost converter of FIG. 1 operating with the control signals of FIGS. 3A-3C, FIGS. 4A-4C, and FIGS. 5A-5C may be used in a voltage mode control loop, as in FIG. 7, or an average current mode control loop as shown in FIG. 8 in order to regulate the load output, Vout. Additionally, the buck-boost converter of FIG. 1 operating under the same control signals may also be used with many other control schemes, for example, hysteretic voltage mode control. In addition to sensing the voltage of the load output as shown in FIG. 7, the control loop may also sense other circuit aspects including but not limited to the voltage of the input power source, Vin, and the current in any of the switch elements. Furthermore, instead of regulating the load output, Vout, the buck-boost converter of FIG. 1 operating with the control signals of FIGS. 3A-3C, FIGS. 4A-4C, and FIGS. 5A-5C may also be used inside a control loop that may instead regulate the current into the load output or may regulate the input current from the input power source.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A buck-boost converter comprising:
an inductance having a first and a second connection;
an electronic switch A configured to cause the first connection to the inductance to be controllably coupled to an input voltage source;
an electronic switch B configured to cause the first connection to the inductance to be controllably coupled to a ground;
an electronic switch C configured to cause the second connection to the inductance to be coupled to a ground;
an electronic switch D configured to cause the second connection to the inductance to be coupled to a load output;
a capacitance configured to filter the load output; and
a switch controller configured to cause switch A to be open when switch B is closed, switch B to be open when switch A is closed, switch C to be open when switch D is closed, and switch D to be open when switch C is closed, and to cause switches A, B, C, and D to cyclically close in accordance with one of the following patterns:
a first pattern during which:
during a buck mode of operation of the buck-boost converter:
switches B and C are closed during one interval of the cycle;
switches A and D are closed during another interval of the cycle; and
switches B and D are closed during a still further interval of the cycle; and
during a boost mode of operation of the buck-boost converter:
switches B and C are closed during one interval of the cycle;
switches A and C are closed during another interval of the cycle; and
switches A and D are closed during a still further interval of the cycle; and
a second pattern during which:
during a buck mode of operation of the buck-boost converter:
switches B and C are closed during one interval of the cycle;
switches A and D are closed during another interval of the cycle; and
switches B and D are closed during a still further interval of the cycle; and
during a buck-boost mode of operation of the buck-boost converter:
switches B and C are closed during one interval of the cycle;
switches A and are closed C during another interval of the cycle;
switches A and D are closed during a still further interval of the cycle; and
switches B and D are closed during a still further interval of the cycle; and during a boost mode of operation of the buck-boost converter:
   switches B and C are closed during one interval of the cycle;
   switches A and C are closed during another interval of the cycle; and
   switches A and D are closed during a still further interval of the cycle; and
a third pattern during which:
   during a buck mode of operation of the buck-boost converter:
     switches B and C are closed during one interval of the cycle;
     switches A and D are closed during another interval of the cycle; and
     switches B and D are closed during a still further interval of the cycle; and
   during a buck-boost mode of operation of the buck-boost converter:
     switches B and C are closed during one interval of the cycle; and
     switches A and D are closed during a still further interval of the cycle; and
   during a boost mode of operation of the buck-boost converter:
     switches B and C are closed during one interval of the cycle;
     switches A and C are closed during another interval of the cycle; and
     switches A and D are closed during a still further interval of the cycle.

2. The buck-boost converter of claim 1 wherein the switch controller is configured to cyclically close switches A, B, C, and/or D in accordance with the first pattern.

3. The buck-boost converter of claim 1 wherein the switch controller is configured to cyclically close switches A, B, C, and/or D in accordance with the second pattern.

4. The buck-boost converter of claim 1 wherein the switch controller is configured to cyclically close switches A, B, C, and/or D in accordance with the third pattern.

5. The buck-boost converter of claim 1 wherein the cyclic closure is periodic.

6. The buck-boost converter of claim 1 wherein the mode of operation and the duration of each switch closure is governed by a control signal.

7. The buck-boost converter of claim 5 wherein the switch controller is configured to cause changes in mode of operation and the duration of each switch closure to smoothly track changes in the control signal.

8. The buck-boost converter of claim 5 wherein the control signal is based on the voltage at the load output.

9. The buck-boost converter of claim 5 wherein the control signal is based on the voltage of the input voltage source.

10. The buck-boost converter of claim 5 further comprising a voltage mode control loop configured to generate the control signal.

11. The buck-boost converter of claim 5 further comprising an average current mode control loop configured to generate the control signal.

12. The buck-boost converter of claim 5 wherein the switch controller is configured to cause the duration of the closures of switches B and C to be substantially constant, notwithstanding changes in the control signal.

13. The buck-boost converter of claim 1 wherein the switch controller is configured to cause the duration of the closures of switches B and C to be substantially constant, notwithstanding changes in the frequency of the cycle.

14. The buck-boost converter of claim 1 wherein the switch controller is configured to cause the duration of the closures of switches B and C to vary as a function of the frequency of the cycle.

15. The buck-boost converter of claim 1 wherein each cycle during each mode consists of only the intervals which are recited in claim 1.

16. The buck-boost converter of claim 1 further comprising a boost capacitor associated with the each connection to the inductor and wherein the circuit is configured to charge each boost capacitor when switches B and C are closed.

17. The buck-boost converter of claim 1 wherein the switches B and D are rectifying devices such as, but not limited to, junction diodes.

18. The buck-boost converter of claim 1 wherein each of the patterns includes an additional mode of operation which is different from the other modes of operation for that pattern.

19. The buck-boost converter of claim 18 wherein the additional mode of operation for each pattern includes keeping switch B closed throughout the entire cycle.

20. A buck-boost converter comprising:
an inductance having a first and a second connection;
an electronic switch A configured to cause the first connection to the inductance to be controllably coupled to an input voltage source;
an electronic switch B configured to cause the first connection to the inductance to be controllably coupled to a ground;
an electronic switch C configured to cause the second connection to the inductance to be controllably coupled to a ground;
an electronic switch D configured to cause the second connection to the inductance to be controllably coupled to a load output;
a capacitance configured to filter the load output; and
a switch controller configured to cause switch A to be open when switch B is closed, switch B to be open when switch A is closed, switch C to be open when switch D is closed, and switch D to be open when switch C is closed, and to cause switches A, B, C, and D to cyclically close such that switches B and C are closed during at least one interval of each cycle during both the buck and boost modes of operation, wherein the periods of the cyclical closures and the intervals during which B and C are closed are constant, notwithstanding changes in operating conditions.

21. A buck-boost converter comprising:
an inductance having a first and a second connection;
an electronic switch A configured to cause the first connection to the inductance to be controllably coupled to an input voltage source;
an electronic switch B configured to cause the first connection to the inductance to be controllably coupled to a ground;
an electronic switch C configured to cause the second connection to the inductance to be controllably coupled to a ground;
an electronic switch D configured to cause the second connection to the inductance to be controllably coupled to a load output;
a capacitance configured to filter the load output; and
a switch controller configured to cause switch A to be open when switch B is closed, switch B to be open when switch A is closed, switch C to be open when switch D is closed, and switch D to be open when switch C is closed, and to cause switches A, B, C, and D to cyclically close based on a control signal such that switches A and D are closed during an interval of each cycle and such that these intervals are never both simultaneously altered in response to a small change in the control signal during any mode of operation, wherein the periods of the cyclical closures are constant, notwithstanding changes in operating conditions.

22. A buck-boost converter comprising:

an inductance having a first and a second connection;

an electronic switch A configured to cause the first connection to the inductance to be controllably coupled to an input voltage source;

an electronic switch B configured to cause the first connection to the inductance to be controllably coupled to a ground;

an electronic switch C configured to cause the second connection to the inductance to be controllably coupled to a ground;

an electronic switch D configured to cause the second connection to the inductance to be controllably coupled to a load output;

a capacitance configured to filter the load output; and a switch controller configured to cause switch A to be open when switch B is closed, switch B to be open when switch A is closed, switch C to be open when switch D is closed, and switch D to be open when switch C is closed, and to cause switches A, B, C, and D to cyclically close such that switches B and C are closed during at least one interval of each cycle during both the buck and boost modes of operation, wherein the switch controller is configured to cause the switches B and C to close independent of the instantaneous current through the inductance.

* * * * *